United States Patent [19]
Maruoka

[11] Patent Number: 5,631,980
[45] Date of Patent: May 20, 1997

[54] IMAGE PROCESSING APPARATUS FOR PROCESSING IMAGE DATA REPRESENTATIVE OF AN IMAGE IN ACCORDANCE WITH THE TYPE OF PROCESSING DESIGNATED BY A DESIGNATING MEANS

[75] Inventor: Hiroshi Maruoka, Yokohama, Japan

[73] Assignee: Canon Kabushiki Kaisha, Tokyo, Japan

[21] Appl. No.: 408,104

[22] Filed: Mar. 21, 1995

Related U.S. Application Data

[63] Continuation of Ser. No. 150,248, Nov. 9, 1993, abandoned, which is a continuation of Ser. No. 898,358, Jun. 12, 1992, abandoned, which is a continuation of Ser. No. 611,441, Nov. 13, 1990, abandoned, which is a continuation of Ser. No. 361,704, Jun. 1, 1989, abandoned, which is a continuation of Ser. No. 841,514, Mar. 19, 1986, abandoned.

[30] Foreign Application Priority Data

| Mar. 20, 1985 | [JP] | Japan | 60-57206 |
| Mar. 20, 1985 | [JP] | Japan | 60-57207 |
| Mar. 20, 1985 | [JP] | Japan | 60-57208 |
| Mar. 20, 1985 | [JP] | Japan | 60-57209 |
| Mar. 20, 1985 | [JP] | Japan | 60-57210 |
| Mar. 20, 1985 | [JP] | Japan | 60-57211 |
| Mar. 20, 1985 | [JP] | Japan | 60-57212 |

[51] Int. Cl.$^6$ ................................ G06K 9/36
[52] U.S. Cl. ........................................ 382/276
[58] Field of Search ............................ 345/126, 127; 358/451, 452, 453; 395/145, 146, 148, 153, 154; 382/155, 298, 254, 276, 309, 317, 323

[56] References Cited

U.S. PATENT DOCUMENTS

| Re. 31,200 | 4/1983 | Sukonick | 340/709 |
| 3,976,982 | 8/1976 | Eiselen | 382/47 |
| 4,617,596 | 10/1986 | Yoshida et al. | 382/57 |
| 4,672,683 | 6/1987 | Matsueda | 382/57 |
| 4,677,551 | 6/1987 | Suganuma | 382/57 |
| 4,685,140 | 8/1987 | Mount, II | 382/57 |
| 4,692,757 | 9/1987 | Tsuhara | 340/724 |
| 4,694,288 | 9/1987 | Harada | 340/721 |
| 4,761,818 | 8/1988 | Bannai | 382/57 |
| 4,868,781 | 9/1989 | Kimura et al. | 382/57 |

Primary Examiner—Jose L. Couso
Attorney, Agent, or Firm—Fitzpatrick, Cella, Harper & Scinto

[57] ABSTRACT

An image processing apparatus has an image reader, an image memory for storing image data and having an image expanding area for expanding image data, a keyboard for inputting necessary data for editing image data, and a CPU for operating the image data so as to reproduce an image edited in accordance with information input at the keyboard by the operator. Desired areas of an original can be reproduced at desired areas of fan fold paper. When image processing is interrupted during printing, image data already read and stored in a buffer memory can be saved and used for printing when printing is resumed.

15 Claims, 13 Drawing Sheets

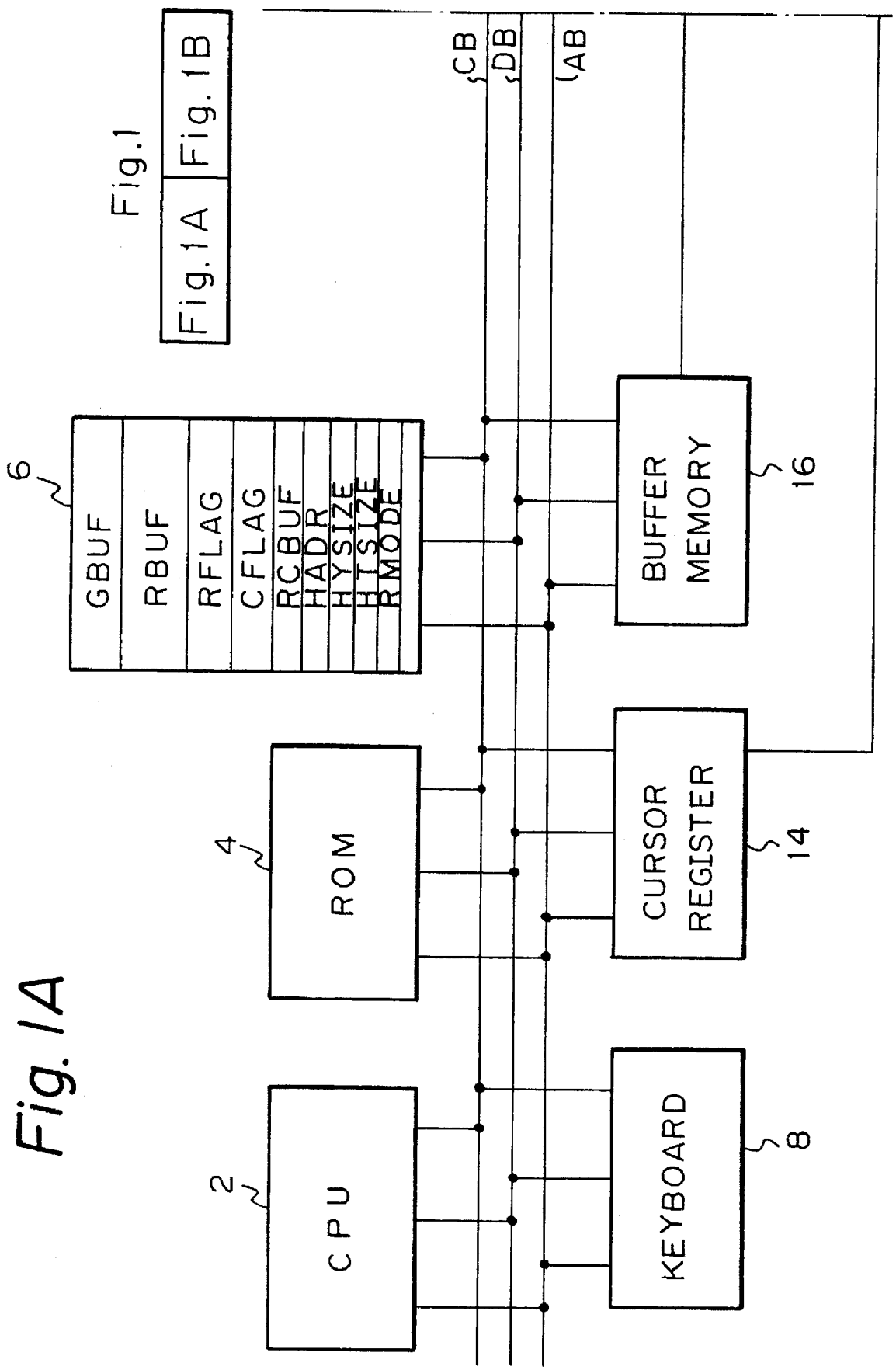

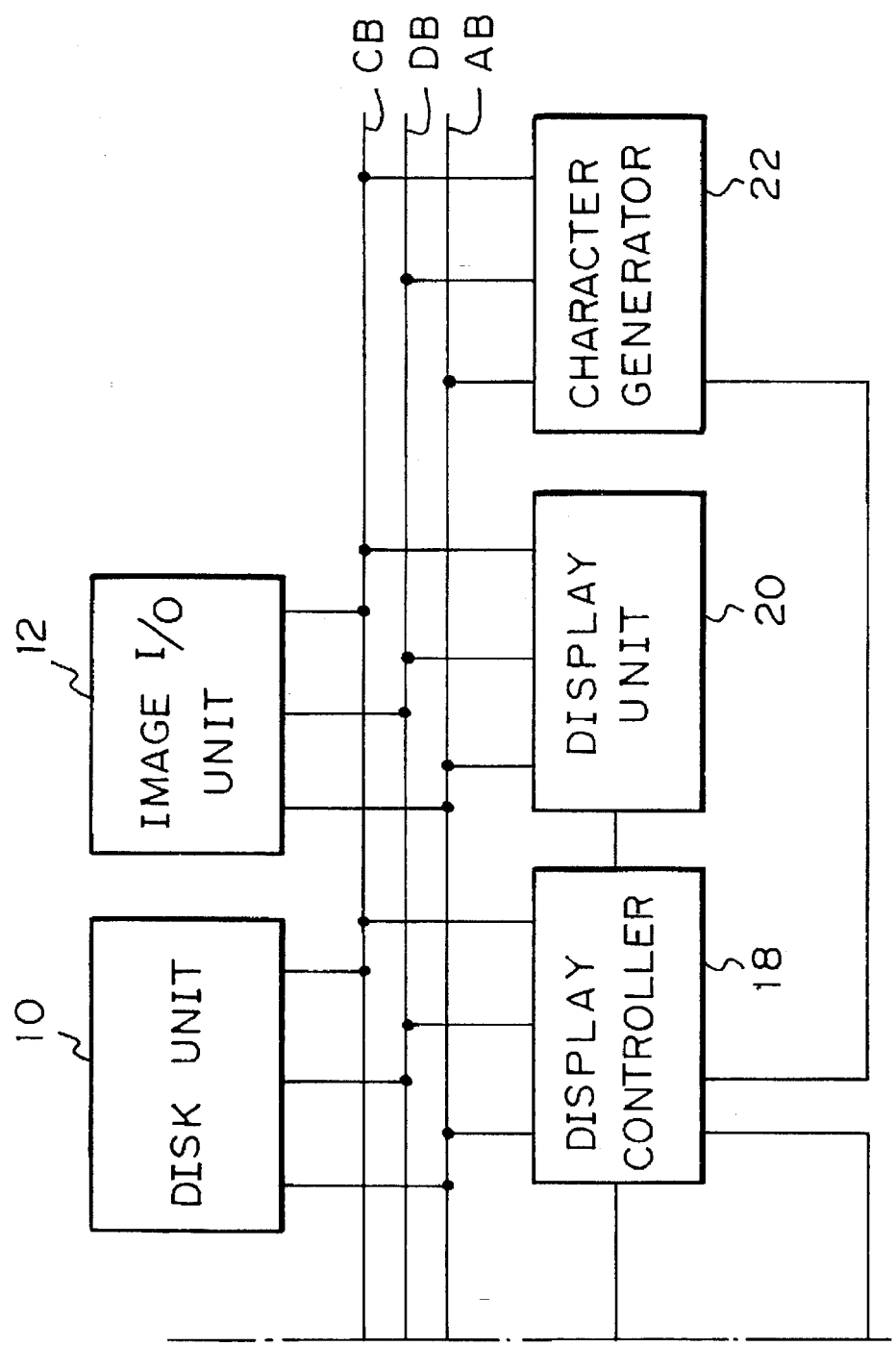

IMAGE PROCESSING APPARATUS FOR PROCESSING IMAGE DATA REPRESENTATIVE OF AN IMAGE IN ACCORDANCE WITH THE TYPE OF PROCESSING DESIGNATED BY A DESIGNATING MEANS

This application is a continuation of application Ser. No. 08/150,248, filed Nov. 9, 1993, now abandoned, which is a continuation of application Ser. No. 07/898,358 filed Jun. 12, 1992, now abandoned, which is a continuation of application Ser. No. 07/611,441, filed Nov. 13, 1990, now abandoned, which is a continuation of application Ser. No. 07/361,704, filed Jun. 1, 1989, now abandoned, which is a continuation of application Ser. No. 06/841,514, filed Mar. 19, 1986, now abandoned.

BACKGROUND OF THE INVENTION

1. Field of the Invention

The present invention relates to an apparatus for performing image processing.

2. Related Background Art

A typical example of an image processing apparatus is an apparatus for defining an image area corresponding to an original image in an image memory, and expanding the original image read by an image reading means to cover the entire image area.

However, when an original image is read and image editing such as image synthesis is to be performed, a read area desired by an operator is often just a part of the original image, and this area must be expanded in a proper location. In this case, image memory access time, unnecessary data erasure time, and editing time are prolonged, and complicated operations are required while the image is being read. As a result, processing efficiency in editing is degraded.

SUMMARY OF THE INVENTION

It is an object of the present invention to provide an image processing apparatus comprising a means, having areas corresponding to an original surface and an image area, for easily designating a read area of an original by designating coordinates on those areas, wherein a desired read area of the original image can be properly expanded on the image area, thereby improving editing processing efficiency.

It is another object of the present invention to provide an image processing apparatus wherein operation contents for combining two images to be edited can be preset, a read image is expanded onto an editing image area, and the expanded image is synthesized with an image currently read while predetermined operations between corresponding images are performed, thereby improving editing processing efficiency.

It is still another object of the present invention to provide an image processing apparatus wherein image reading is interrupted after an image from a first area is read, and an original image or a read head is moved to another area so that the image subsequently read can correspond to the previous image read from the first area, thereby improving editing processing efficiency.

It is still another object of the present invention to provide an image processing apparatus wherein a reference index is formed on a read head opposite an original image, and a positional error of the index and the read head is corrected to optimally read an image of a desired area, thereby providing improved operability.

It is still another object of the present invention to provide an image processing apparatus wherein a read image is prestored before image synthesis is performed, image synthesis can be cancelled if desired, and the stored image is expanded in an image area, thereby improving editing processing efficiency.

It is still another object of the present invention to provide an image processing apparatus, wherein operation contents for two-image synthesis can be set, a read image is expanded onto an editing image area, and the expanded image is synthesized with an image currently being read while predetermined operations between corresponding images are performed, thereby improving editing processing efficiency.

It is still another object of the present invention to provide an image processing apparatus wherein synthesis processing is performed for every predetermined amount of image data, and the processed data is sequentially displayed on an image area, thereby allowing an operator to check an image synthesis state and hence improving editing operability.

It is still another object of the present invention to provide an image processing apparatus wherein a desired read area of the original image can be properly expanded on the editing image area to improve editing processing efficiency.

BRIEF DESCRIPTION OF THE DRAWINGS

FIG. 1 shows how FIGS. 1A and 1B are assembled to form a block diagram of an image processing apparatus according to an embodiment of the present invention;

DETAILED DESCRIPTION OF THE PREFERRED EMBODIMENT

Figure 2:
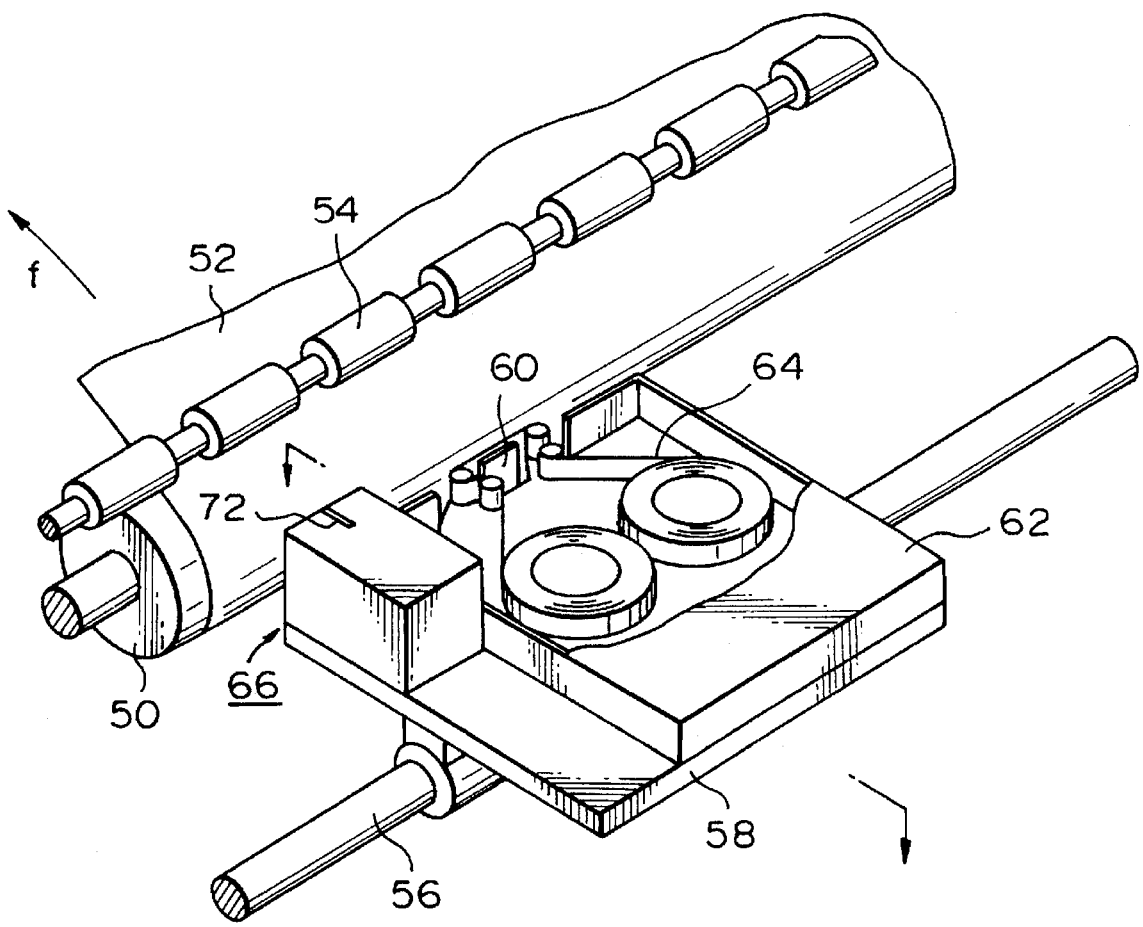
FIG. 2 is a perspective view showing a main part of an image input/output unit in the apparatus of FIG. 1.

The present invention will be described in detail with reference to the accompanying drawings.

FIGS. 1A and 1B together show an image processing apparatus according to an embodiment of the present invention. A CPU 2 comprises a microprocessor. The microprocessor performs arithmetic and logic operations for character and graphic image processing, and controls constituent elements connected to address, control and data buses AB, CB and DB according to processing steps in FIGS. 4 to 7. The address bus AB serves as a transfer line for transferring address signals to the components controlled by the CPU 2. The control bus CB serves as a transfer line for transferring control signals to the components controlled by the CPU 2. The data bus DB serves as a transfer path for exchanging data between the constituent components.

A read-only memory (ROM) 4 stores control programs of the CPU 2, such as the processing steps of FIGS. 4 to 7.

A random access memory (RAM) 6 stores 16-bit data (16 bits correspond to one word) and is used to temporarily store various data associated with the constituent components. The RAM 6 has an image storage area GBUF for storing binary images formed or being formed in a bit map. The RAM 6 also has a buffer area RBUF for temporarily storing a read image and an image memory area RCBUF for saving the image data.

The RAM 6 further includes an address area HADR, areas HYSIZE and HTSIZE, and an area RMODE. The address area HADR stores upper left point addresses of an image memory area corresponding to a read area of an image designated by an operator and/or a storage area of the image in a defined image area. The areas HYSIZE and HTSIZE store the numbers of horizontal and vertical dots of a designated area. The area RMODE is used in the read mode to store the operation contents for editing. For example, data "1" is stored in the area RMODE in OR processing. However, data "0" is stored in the area RMODE in overwrite processing.

A start correction RFLAG in the RAM 6 is used to determine if a positional error between a read sensor and an index (to be described later) formed on a read head is to be corrected when the read head or the original is moved to start reading an image. If necessary, the flag RFLAG is turned on. Otherwise, it is kept off. A flag CFLAG in the RAM 6 is a cursor shape flag corresponding to the shape of the cursor used for designating a read area in the image area. When a single shift cursor (i.e., the cursor is moved character by character) is used, the flag CFLAG is kept off. However, when a cross dot point cursor whose intersection represents one dot is used, the flag CFLAG is kept on.

A keyboard 8 serves as an input device for allowing the operator to input information to the system. The keyboard 8 includes alphanumeric/symbol input keys such as letter keys, hiragana keys, and katakana keys, as well as various image processing apparatus function keys such as a kanji start/end designation key, an area designation key used for designating a read area, a read mode key for designating a read mode, a read start key for designating a start of image reading, an end key for designating an end of processing, an interrupt key for giving an interrupt command for interrupting the read mode, and a cancel key for generating a command for cancelling reading.

A disk unit 10 accesses a magnetic disk as an external storage for storing documents and images. The disk unit 10 controls storage and read access of documents and images in response to input at the keyboard 8.

An image input/output (I/O) unit 12 of this embodiment has an integral assembly of a printer for recording an image, and a reader for reading an image.

A cursor register 14 is used for read/write access under the control of the CPU 2. A display controller 18 causes a cursor to be displayed on a display unit 20 at a position corresponding to the address stored in the cursor register 14.

A buffer memory 16 corresponds to a display screen of the display unit 20, and stores document data entered at the keyboard 8 and image data read by the reader of the I/O unit 12.

The display controller 18 causes the display unit 20 to display the contents from the cursor register 14 and the buffer memory 16 at corresponding positions.

The display unit 20 comprises a cathode-ray tube (CRT) display. The dot display pattern and cursor display on the display unit 20 are controlled by the display controller 18. A scanning and display technique for displaying the content of the buffer 16 on the display unit 20 at a corresponding position is known to those skilled in the art. In this embodiment, the contents of the image memory area GBUF are properly converted and stored in the buffer memory 16 so as to perform display.

A character generator 22 generates character signals such as character, symbol and cursor signals which are then displayed on the display unit 20.

The image processing apparatus having the arrangement described above is operated in response to various input signals from the keyboard 8. When an input signal is generated by the keyboard 8, an interrupt signal is supplied to the CPU 2. In response to this signal, various control instructions are read out from the ROM 4 of the CPU 2, and various types of control can be performed according to these control instructions.

Figure 3:
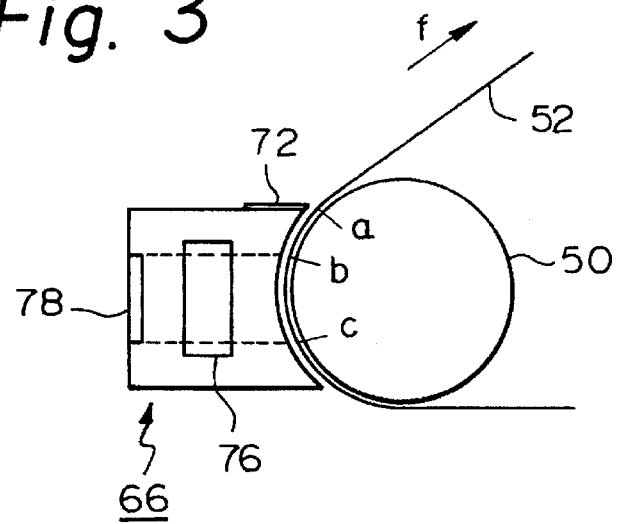
FIG. 3 is a sectional view for explaining a read head in FIG. 2.

FIG. 2 is a schematic perspective view showing a main part of the image I/O unit 12 in FIG. 1, and FIG. 3 is a sectional view thereof taken along the line A—A. In this embodiment, the image I/O unit 12 comprises an integral assembly of a thermal transfer serial printer and read and write heads mounted on a carrier.

Referring to FIG. 2, a recording sheet or an original 52 to be read is wound around a platen roller 50 of the printer. Paper holding rollers 54 urge the recording sheet or original 52 against the platen roller 50. The recording sheet or original 52 can be fed in a feed direction f. A carriage guide 56 is fixed to a printer housing, and is parallel to the platen roller 50. A carrier 58 is mounted on the guide 56 to cause a proper driving means to reciprocate the carrier 58 along the carrier guide 56. A thermal head 60 and an ink ribbon cassette 62 are arranged at positions opposite the platen roller 50. An ink ribbon 64 in the cassette 62 is wound through a gap between the thermal head 60 and the platen roller 50.

An image read head 66 is mounted on the carrier 58 in the image reader. The read head 66, as shown in FIG. 3, has a focusing optical transmission array 76, a read sensor 78 for photoelectrically converting an optical signal to an electrical signal, and a light source (not shown) such as an LED. The sensor 78 has pixels of 24-dots along the vertical direction. An index 72 is formed on the upper surface of the read head 66 to indicate the position of the read sensor 78. Therefore, the operator can visually recognize the current read position by the index.

Referring to FIG. 3, a position a represents an image read position when viewed by the operator who refers to the index 72. A position b is an actual image position when reading is performed at the upper end of the read sensor 78. A position c corresponds to the lower end of the read sensor 78, and represents the image position of the line to be read in the next scanning.

Since the upper end of the read sensor 78 does not physically coincide with the position of the index 72, the original image position a, corresponding to the position of the index 72 referred to by the operator during reading, is different from the image position b read by the read sensor.

In this embodiment, when image reading at one position is interrupted and is restarted at another position, position correction must be performed to make the position a coincide with the position b upon start of reading when the index 72 of the recording head 66 is positioned at the upper end a of the line to be read after interruption.

More particularly, during continuous image reading, a line return by an angular interval of c to b is performed for every 24 dots. When the interrupt command is generated, an angular interval of c to a is adjusted such that the upper end of the next line is located at the position a. When a read start command is generated after the upper end of another read line is located at the position a, the original must be rotated by the angular interval of b to a in a direction opposite the feed direction f.

The unit in FIG. 2 is used as a wordprocessor printer in the following manner. The recording sheet 52 is wound around the platen roller 50, the carrier 58 is moved along the guide 56, the ink ribbon 64 is driven, and the thermal head 60 is operated. However, when the unit in FIG. 2 is used as the image reader, the original 52 is wound around the platen roller 50, the original is irradiated with a light beam from the light source, the carrier 58 is moved along the guide 56, and the original surface is read by the array 76 on the reading sensor 78.

Image editing processing will now be described with reference to FIGS. 4 to 7.

Figure 4:
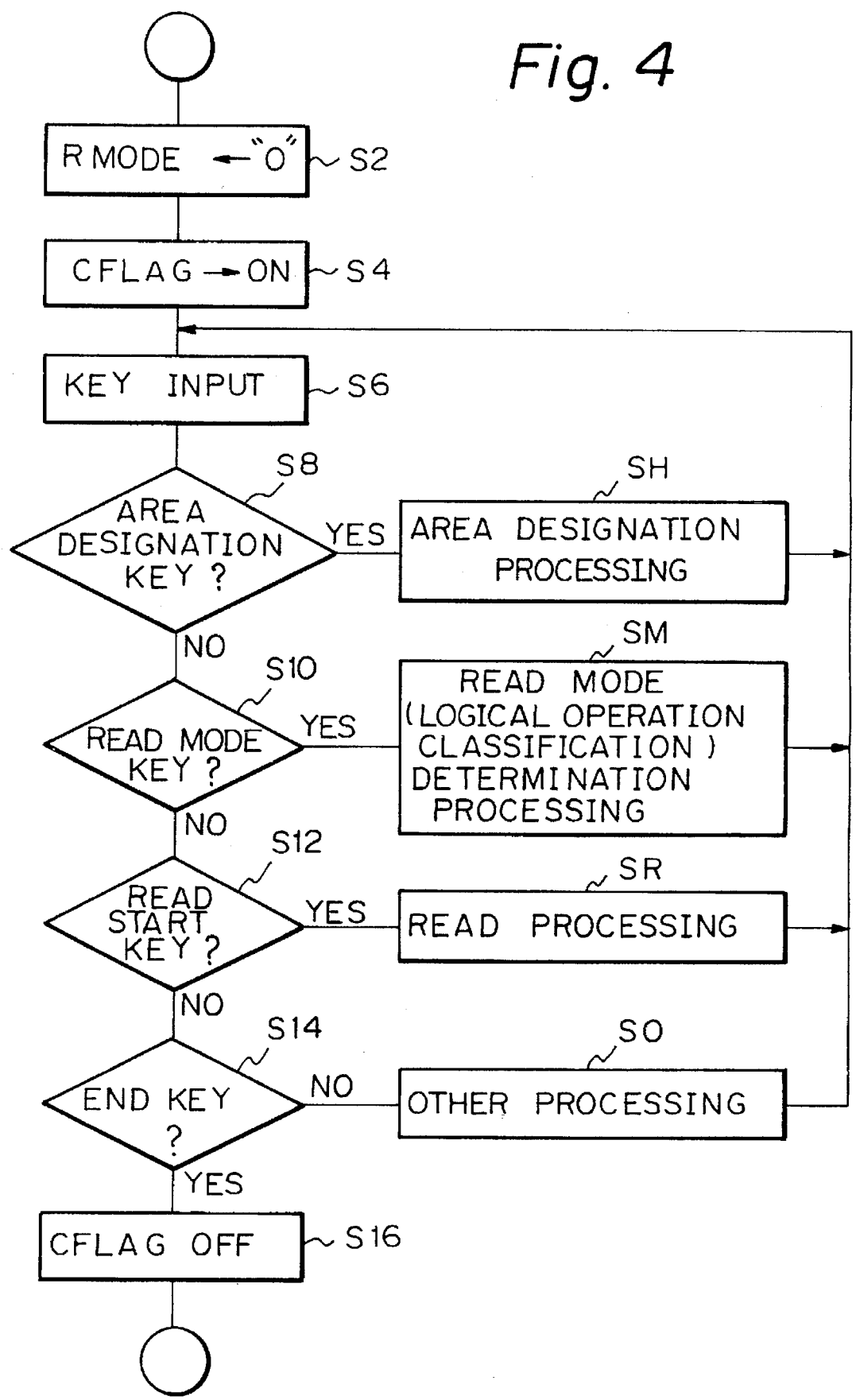
FIGS. 4 to 7 are flow charts for explaining the image processing steps of the apparatus in FIG. 1.

FIG. 4 is a flow chart of image editing processing in the apparatus of this embodiment. An image editing input key is arranged on the keyboard 8 to perform image editing upon operation of this key.

The read mode flag RMODE is set at logic "0" in step S2, and the cursor shape flag CFLAG is kept ON in step S4. When the cursor flag CFLAG is kept on, the dot point cursor is selected and area designation can be simplified.

The CPU awaits a key input in step S6. When the CPU determines in step S8 that the key input is an area designation key input, area designation processing (step SH) is performed. When the CPU determines in step S10 that the key input is a read mode selection key input, the read mode, i.e., logical operation determination processing (step SM) is performed. When the CPU determines in step S12 that the key input is a read start designation key input, read processing (step SR) is performed. When the CPU determines in step S14 that the key input is an end key input, other processing (step SO) such as edited image magnetic disk storage is performed. After any step SH, SM, SR or SO is performed, the flow returns to step S6. However, if the key input is not one of these key inputs, the cursor shape flag CFLAG is turned off in step S16 and the cursor is changed to the single shift cursor. Thereafter, for example, the character processing mode is set.

The processing contents of steps SH, SM and SR are described below.

In step SH, the area corresponding to the image area of the image memory GBUF is displayed on the display screen of the display unit 20 to prompt the operator to designate the read area of the original image and the editing area of the image area. The operator performs the following input in response to prompting.

Figure 8:
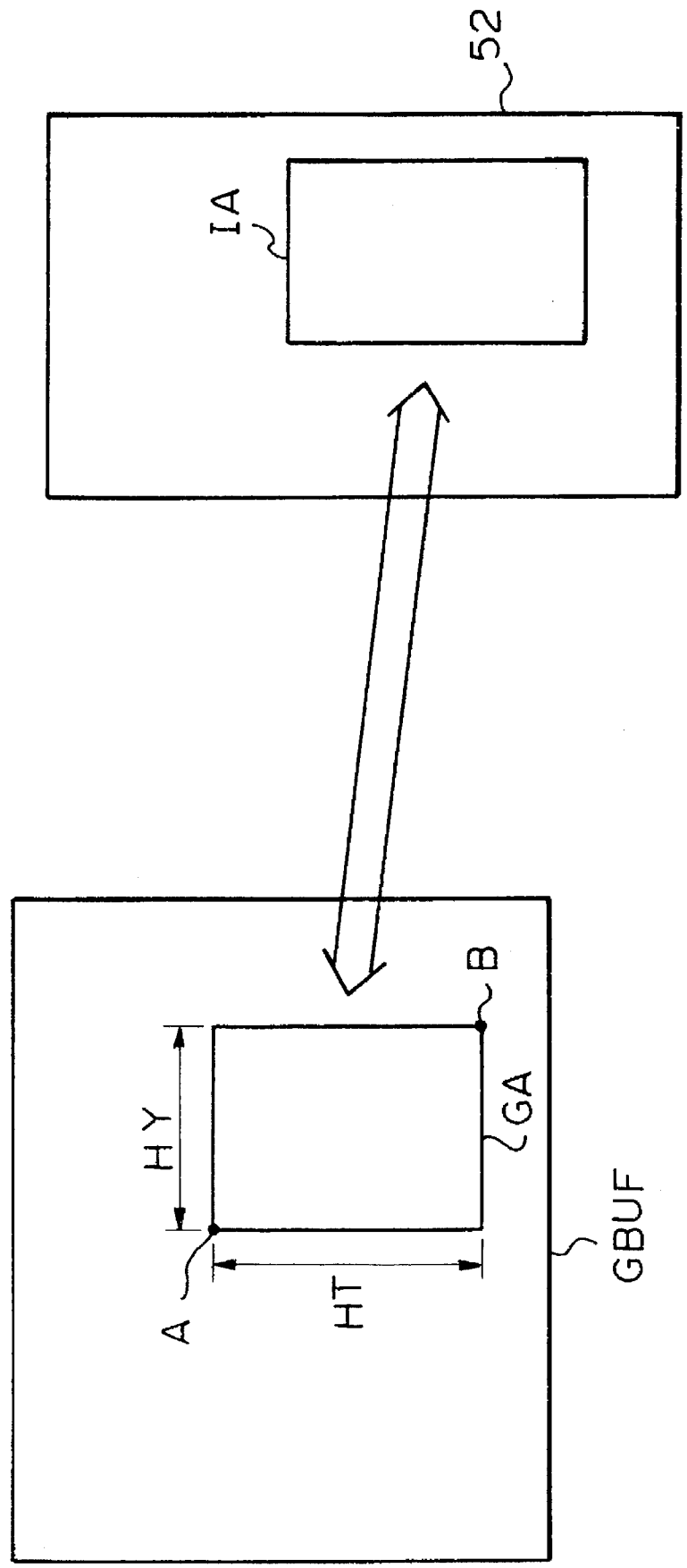
FIGS. 8 to 13 are charts for explaining different image processing modes of the apparatus shown in FIGS. 1A and 1B.

As shown in FIG. 8, in order to input the read area designation of the original image, the image area of the image memory GBUF is displayed in correspondence with the original 52. The operator properly shifts the cursor to designate points A and B of a display screen area GA corresponding to the desired read area of the original 52. The address of the point A in the image memory GBUF and the numbers HY and HT representing the numbers of horizontal and vertical read dots are stored in the areas HADR, HYSIZE, and HTSIZE of the RAM 6. In association with this designation, the operator manually moves the carrier 58 and the platen 50 to coincide the upper left vertex of an area IA with the position a of FIG. 3. The operator performs this operation while visually checking the area.

Figure 9:
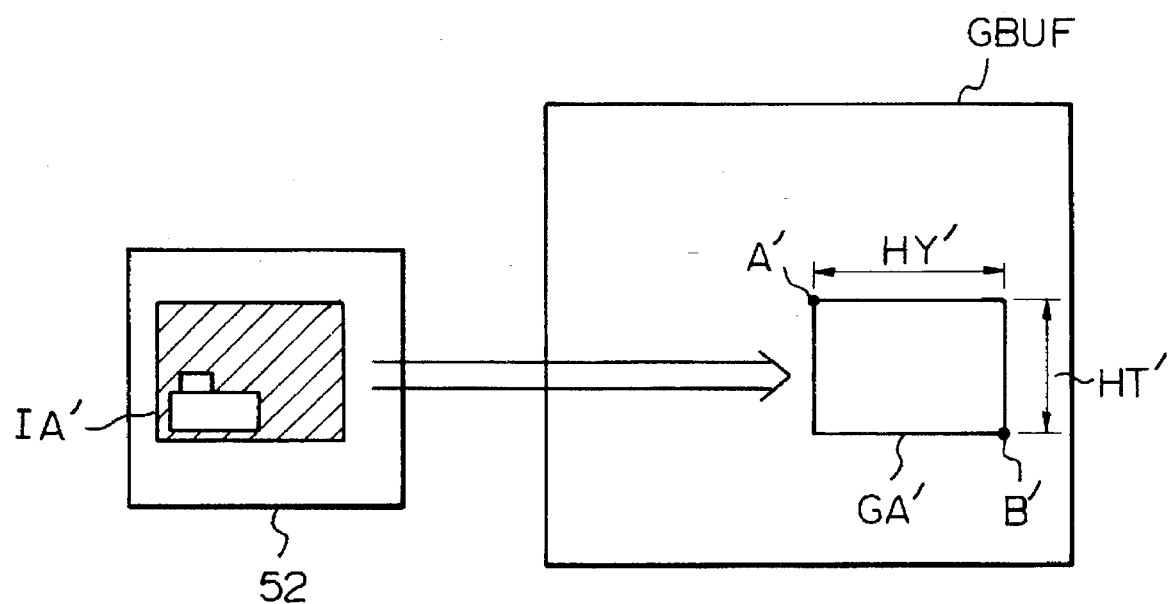

In designation of the area of the image memory GBUF to which the read image is transferred, as shown in FIG. 9, points A' and B' of a display screen area GA' corresponding to a desired area IA' of the original 52 are designated with the cursor. The image memory GBUF address, and numbers HY' and HT' (the numbers of horizontal and vertical dots of the transfer area GA') which correspond to the point A' are respectively stored in the areas HADR, HYSIZE, and HTSIZE of the RAM 6.

After all the values are stored, area designation processing SH is completed. The flow returns to step S6, and the CPU awaits the next key input.

Figure 5:
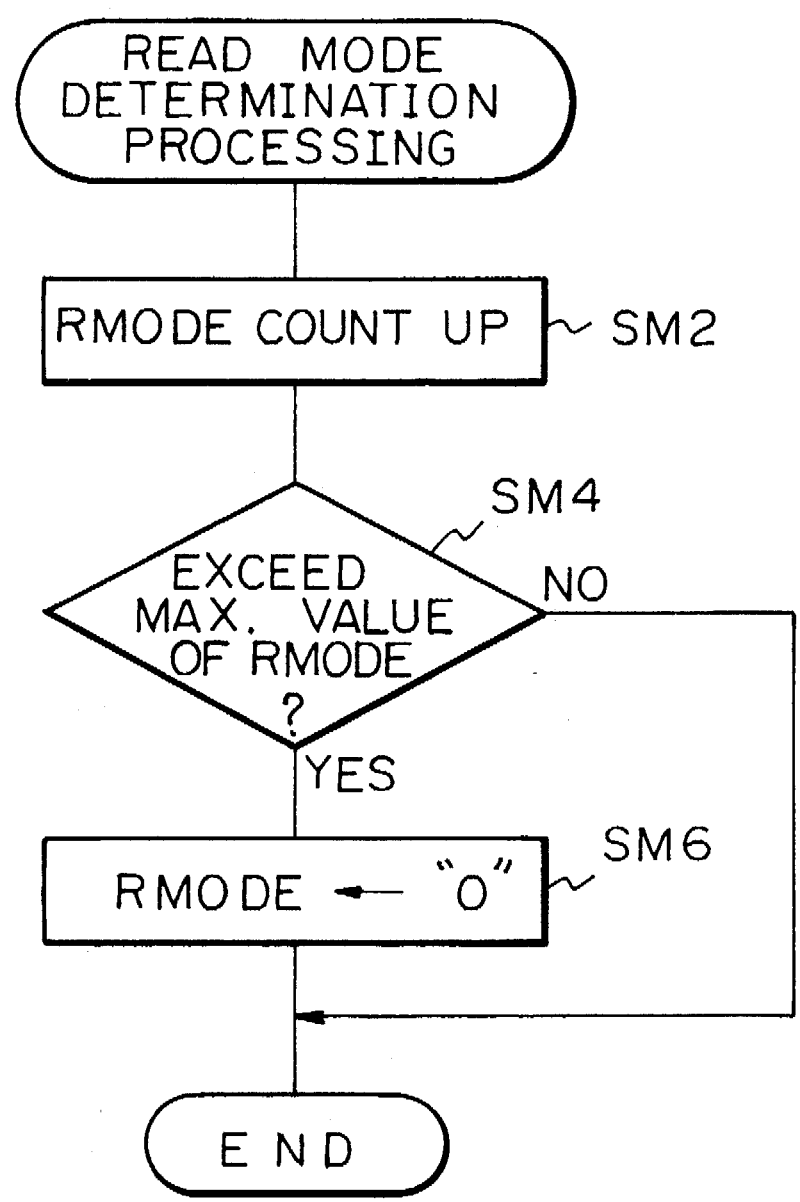

FIG. 5 shows the detailed processing contents of read mode determination processing (step SM). In step SM2, the RMODE is counted up. The CPU checks in step SM4 if the count exceeds an RMODE maximum value ("1" in this embodiment) corresponding to operation processing (2 in this embodiment). If YES in step SM4, the value of the RMODE is reset to "0". However, if NO in step SM4 or processing of step SM6 is completed, an operation processing name corresponding to this value is displayed, and the read mode determination processing is completed. The flow then returns to step s6.

Figure 6A:
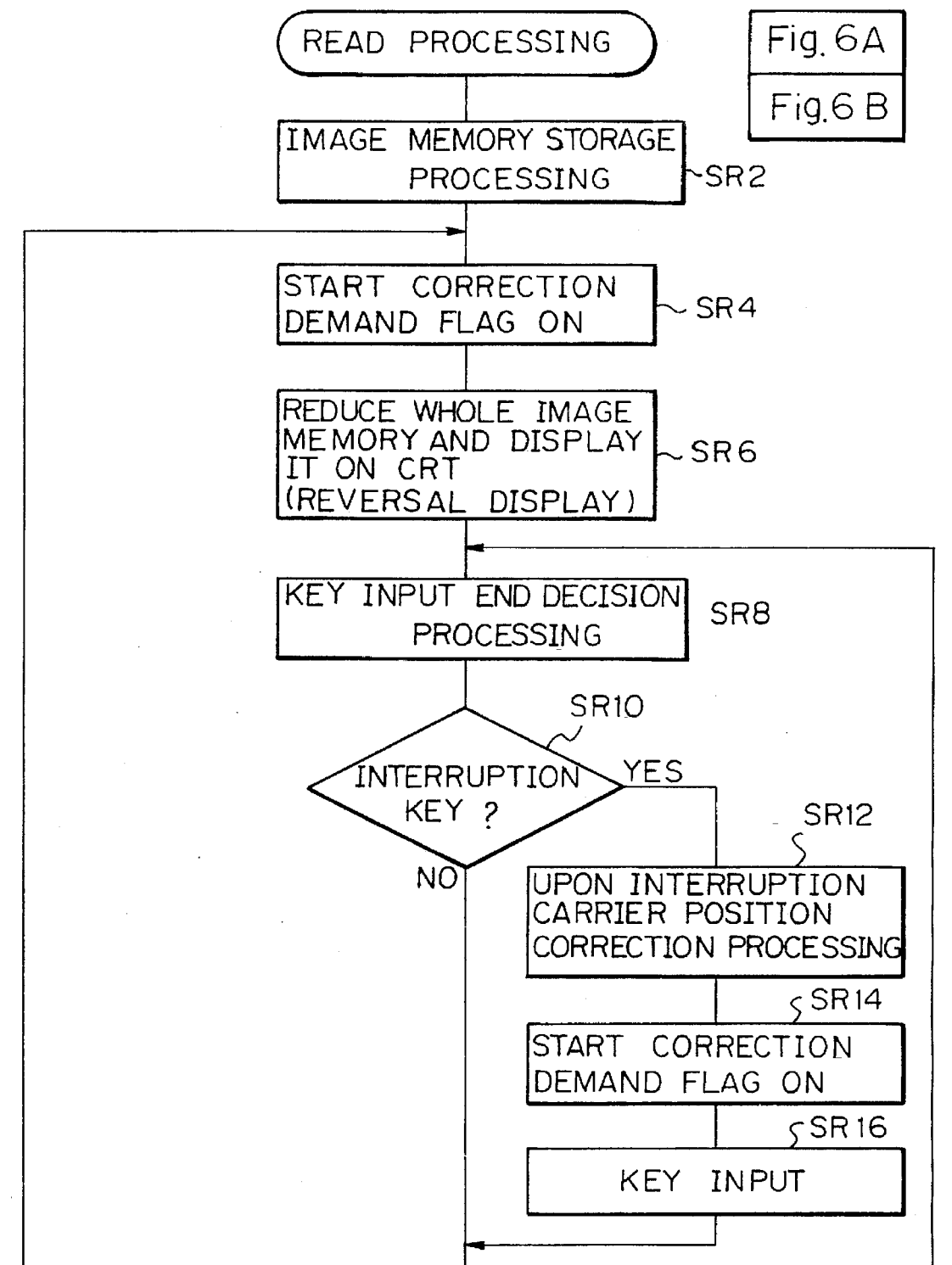
Figure 6B:
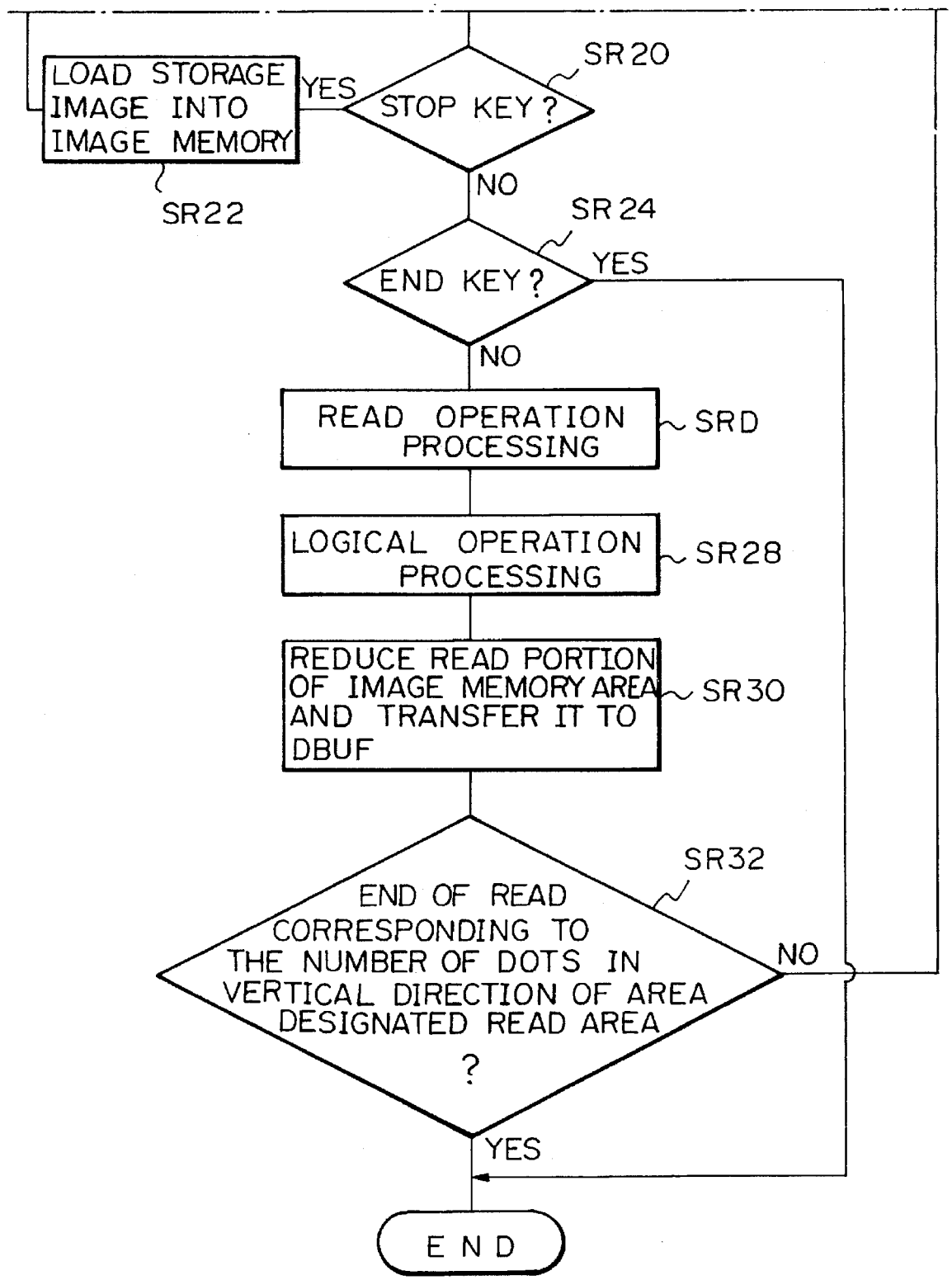

FIG. 6 shows how FIGS. 6A and 6B are assembled to illustrate the detailed processing contents of read processing (step SR). In step SR2, the image data stored in the image memory area GBUF is expanded in the storage image memory area RCBUF. Thereby, even if image synthesis is interrupted, damage to the already stored image data can be prevented. In step SR6, after the start correction flag RFLAG is turned on, the image data in the area GBUF is reduced, and the reduced image data is transferred to the buffer DBUF. The reduced image is inverted and displayed on the display unit 20.

The CPU determines a key input in step SR8. When the CPU determines in step SR10 that the key input is an interrupt key input, the original 52 is rotated by the angular interval of c to a along the feed direction f in step SR12. In step SR14, the start correction flag RFLAG is turned on, and the CPU awaits a key input in step SR16.

If NO in step SR10 or if the key input is detected in step SR16, the CPU checks in step SR20 if the key input is a cancel or stop key input for cancelling the image read mode. If YES in step SR20, the image data stored in the area RCBUF is expanded to the area GBUF in step SR22. If image synthesis has been performed prior to the cancel key input, the corresponding synthesis processing is cancelled. Therefore, image data expanded in the area GBUF prior to synthesis processing can be valid.

If NO in step SR20, the CPU checks in step SR24 if the key input is an end key input. If NO in step SR24, read processing in step SRD (FIG. 7) is performed. In step SR28, the image data stored in the area RBUF is added, in units of dots, to the corresponding image data in the area GBUF (i.e., the image data within the editing area designated in step SH) on the basis of the logical operation contents of the processing in step SM. In step SR30, the read portion of the image memory area GBUF, i.e., the processed image data of horizontal dots is properly reduced, and the reduced data is transferred to the buffer DBUF. This data is finally displayed on the display unit 20. In this case, the synthesized portions are sequentially discriminated, converted and displayed on the display unit. Therefore, the operator can visually check the processing states step by step.

In step SR32, the CPU checks if the image of vertical dots of the read area designated in step SH is completely read. This determination is performed as follows. After the horizontal dots are calculated (step SR28), a vertical unit number of dots (24 corresponding to the number of pixels in this embodiment) is subtracted from the data in the area HTSIZE. The CPU then checks if the value in the area HTSIZE has become negative. If NO in step SR32, the flow returns to step SR8. Thus, the image is read by the vertical dot unit, and logical operations are continued. However, if YES in step SR32 or SR24, read processing is completed, and the flow returns to step S6 of FIG. 4.

Figure 7:
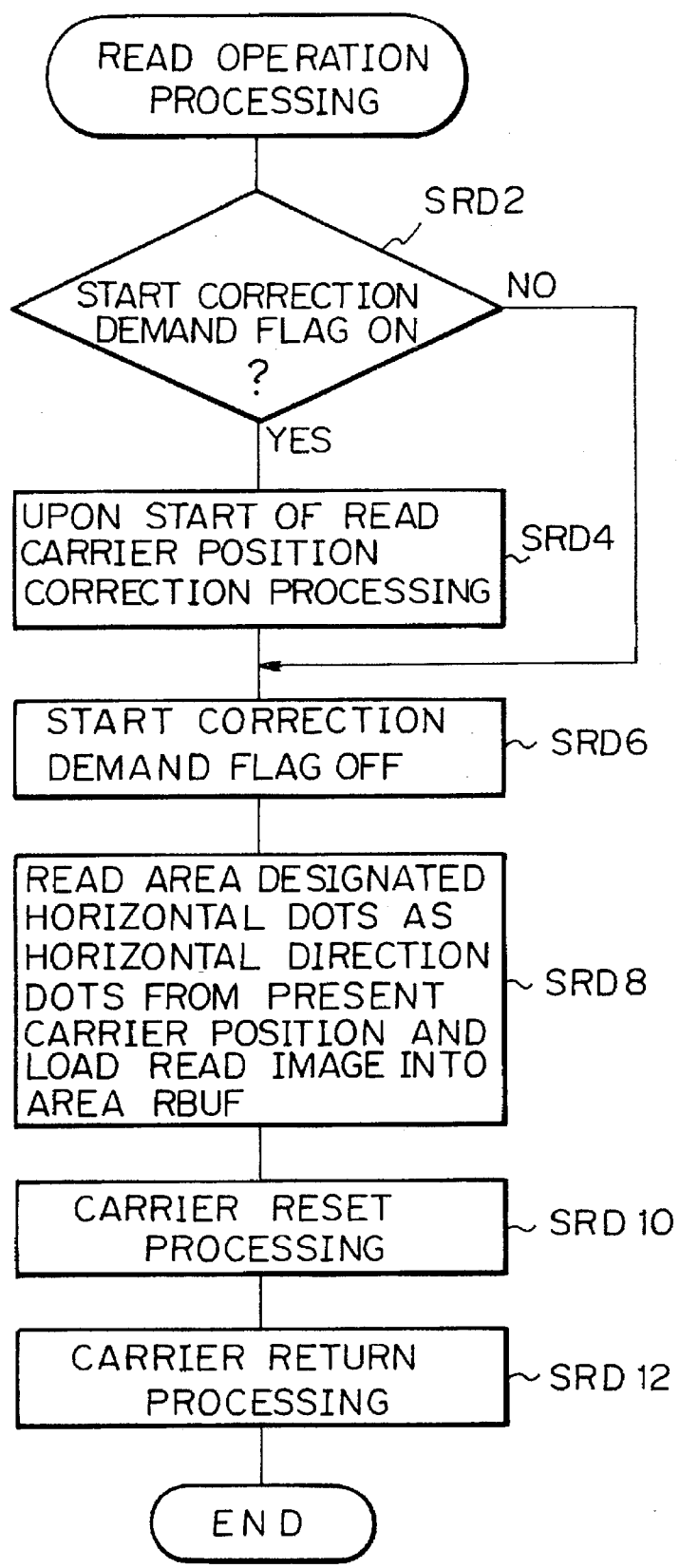

FIG. 7 shows detailed processing contents of the read operation processing SDR. The CPU checks the state of the start correction flag RFLAG in step SRD2. If NO in step SRD2, the flow advances to step SRD6. However, if YES in step SRD2, the original 52 is rewound by the angular distance of b to a in a direction opposite to the feed direction f upon starting of reading. Thereafter, the flow advances to step SRD6.

In step SRD6, the start correction flag RFLAG is turned off. In step SRD8, the horizontal dots from the position of the carrier 58 are read for the designated read area, and the read image data is stored in the area RBUF.

Carriage reset processing and carrier return processing are performed in steps SRD10 and SRD12, respectively. Carrier return processing is performed to feed the original 52 by the vertical dot unit along the feed direction f. When the read operation processing SRD is completed, the flow returns to step SR28 in FIG. 6.

In the image processing apparatus of this embodiment, the desired image area of the original 52 is designated by area designation processing (step SH). At the same time, the operator can easily designate the editing area on the screen. The start position of the read area designated in association with the read area designation is located to coincide with the index 72. This position is corrected appropriately to correspond to the position of the sensor 78 upon reading. During a synthesizing operation or interruption thereof, the operator uses the index 72 as a reference and thereby, can accurately designate the read area.

An interrupt key can be arranged to interrupt image reading according to the operation in step SR10, and the read area can be changed in accordance with the operation of step SH. Even if a plurality of desired read areas of the original are present, these read areas can be properly read in a series of operations.

Figure 10:
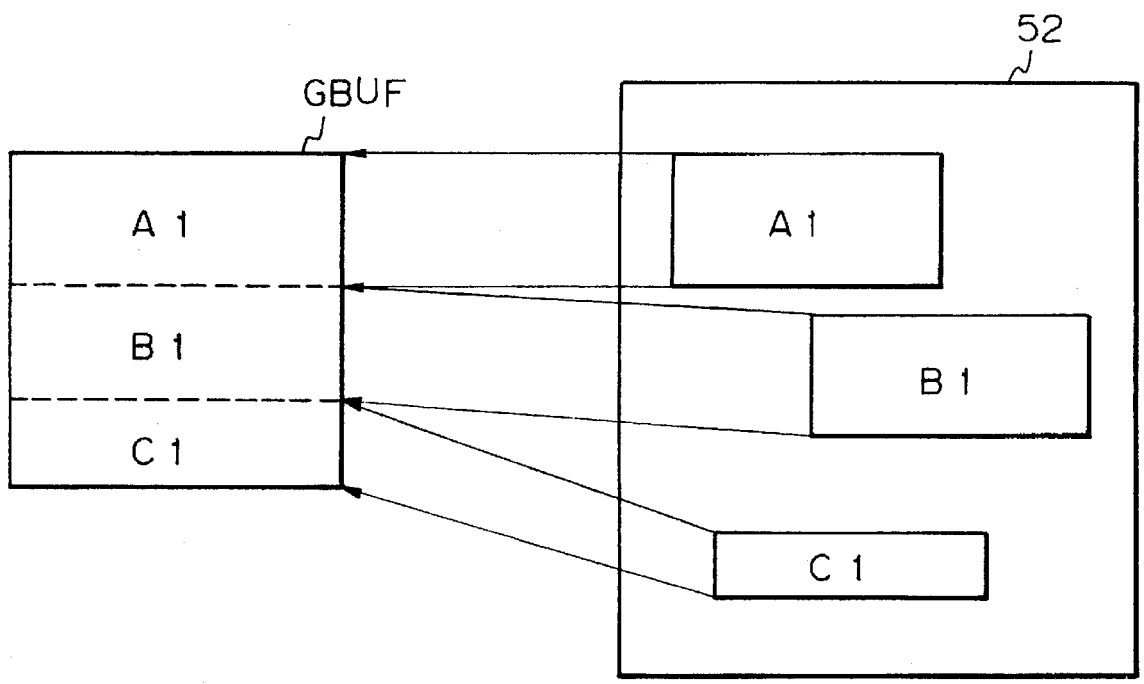

As shown in FIG. 10, for example, if there are three desired read areas A1, B1 and C1 on the original 52, an interrupt command is generated after the area A1 is designated, read and edited in the area GBUF. Another interrupt command is generated after the area B1 is designated, read and edited in the area GBUF. Finally, the area C1 is designated, read and edited in the area GBUF. The processing order of the plurality of areas or portions can be arbitrarily determined by the operator.

Figure 11:
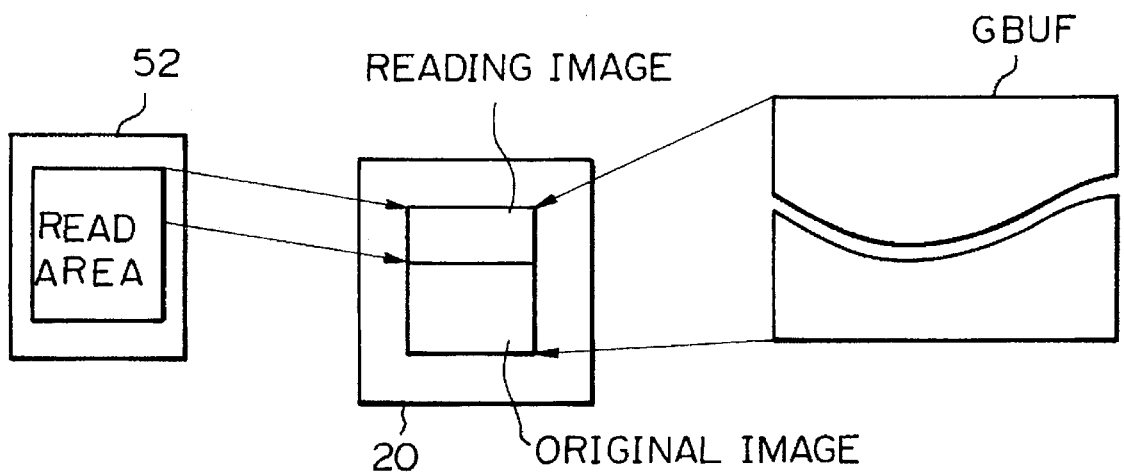

As shown in FIG. 11, image data is sequentially read from the read area of the original 52, operated on and displayed on the display screen of the display unit 20 so as to correspond to the inverted image in the area GBUF in the operations in steps SR6 and SR30. Thus, the operator can visually check the processing states step by step. The operator can check image reading on the screen until the image on the original 52 reaches a necessary portion of the editing image.

Since the image in the area GBUF is prestored prior to editing processing in step SR2, the image will not be damaged even if editing processing is interrupted in step SR20. Therefore, after an interruption, the stored image can be expanded again in the area GBUF in step SR22, and the operator can immediately start editing again.

Figure 12:
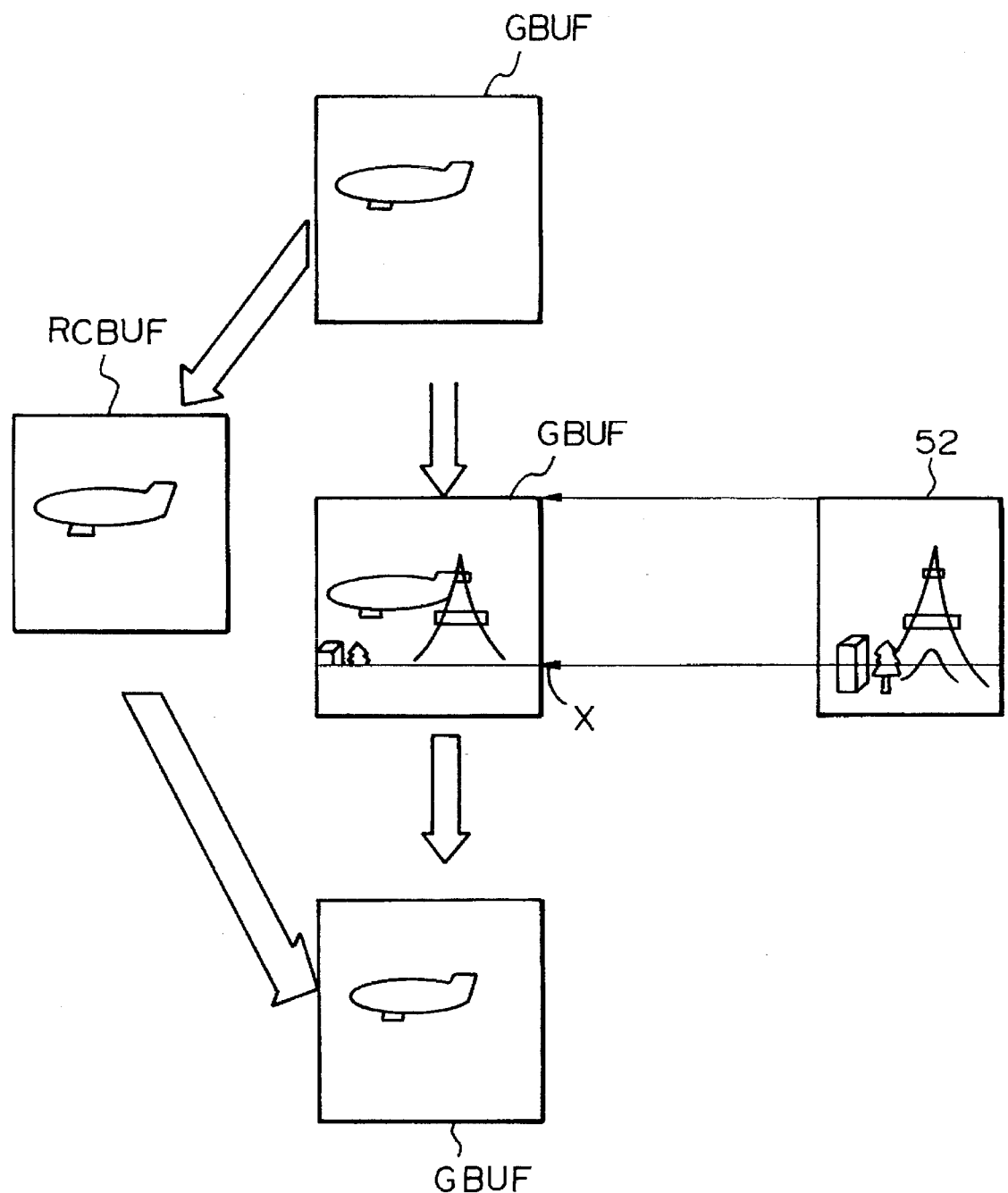
Figure 13:
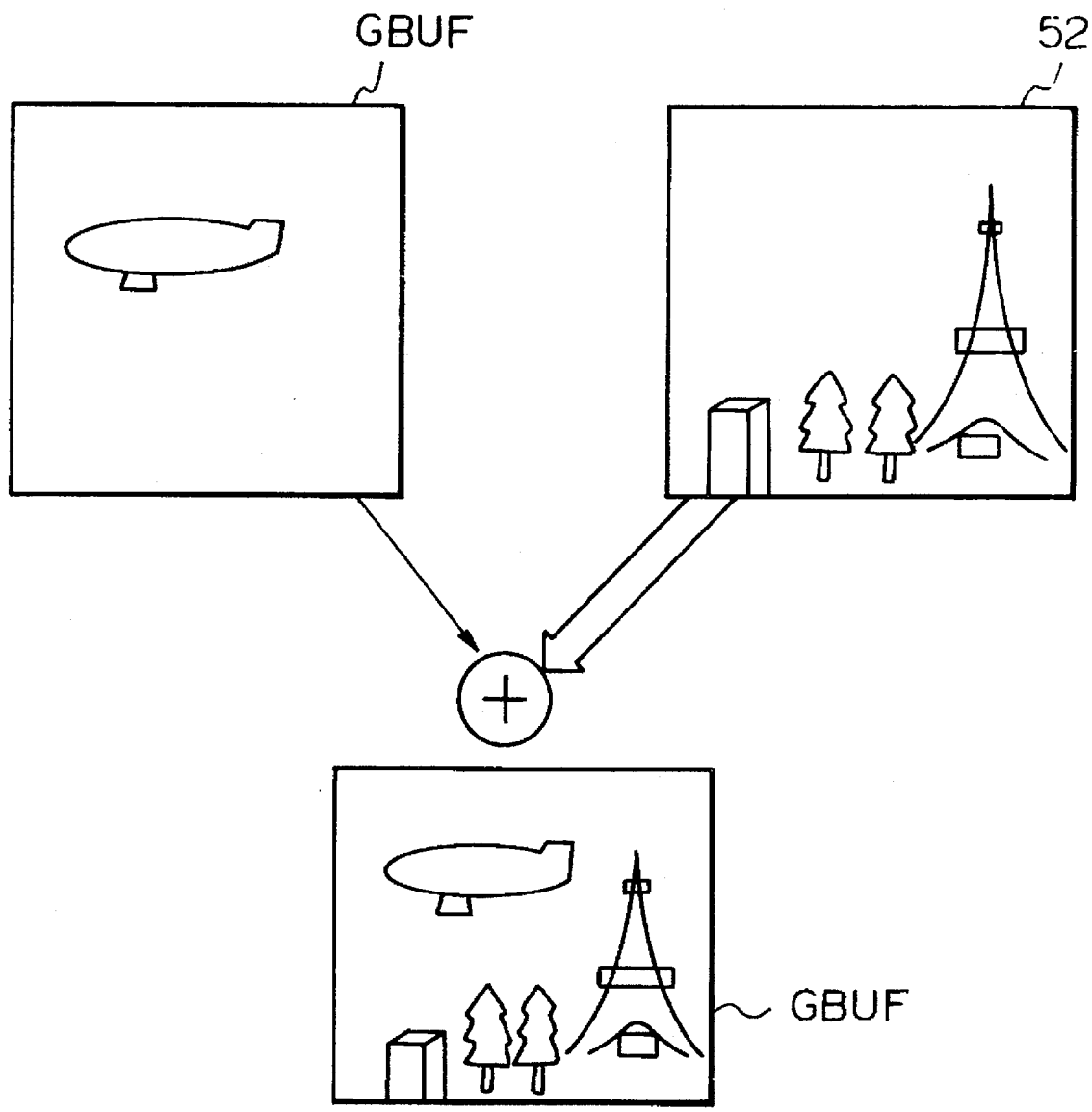

For example, as shown in FIG. 12, the image stored in the area GBUF can be saved in the area RCBUF. OR logical operation on the image of the area GBUF and the image of the original 52 is performed for image synthesis up to a position x. In this state, if the operator depresses the cancel key after noticing the read image positional error, the imaged stored in the RCBUF is overwritten on the image in the area GBUF.

According to this embodiment, when image synthesis processing is performed, the image to be edited is synthesized with images being currently read in accordance with the predetermined operation contents. Therefore, trial-and-error synthesis editing can be flexibly performed.

The above embodiment is described as an image processing apparatus with an image read head mounted in a word-processor. However, the present invention can also be applied to any apparatus with an image reading means. The above embodiment is also described as an image processing apparatus with an image read head mounted on a carrier and moved along a scanning direction with respect to an image surface. However, the image reading head may extend along the entire width of the original surface.

What is claimed is:

1. An image processing apparatus having print means for printing an image, comprising:

image reading means on a carriage of said print means for optically reading an original image and for producing image data representing the original image;

designating means for designating a plurality of areas of the original image;

carriage control means for moving said carriage to each of the plurality of areas of the original image designated by said designating means; and storage control means connected to said image reading means and said designating means for storing image data from said image reading means, said storage control means sequentially reading and storing the designated plurality of areas of the original image read by said image reading means, said storage control means processing the designated plurality of areas of the original image as one block of information, said storage control means comprising a central processing unit.

2. An apparatus according to claim 1, further comprising display means for displaying an image of said image memory means.

3. An apparatus according to claim 1, further comprising designating means for designating an area to be read by said image reading means.

4. An image processing apparatus including a printer comprising:

area designating means for designating a desired area of an original image;

image reading means on a carriage of the printer, in response to the area designation of said area designating means, for optically reading the original image corresponding to the desired area and for producing image data representing the original image;

carriage control means for moving said carriage to each of the plurality of areas of the original image designated by said area designating means;

image memory means for storing image data produced by said image reading means;

storage control means for storing a plurality of desired parts of the original image at each of a plurality of areas of said image memory means, said storage control means storing said plurality of desired parts of the original image on the basis of each positional relation between said plurality of desired parts of the original image, said storage control means comprising a central processing unit; and designating means for designating a memory position of desired parts of the original image.

5. An apparatus according to claim 4, further comprising display means for displaying an image of said image memory means.

6. An apparatus according to claim 4, further comprising designating means for designating an area to be read by said image reading means.

7. An image processing apparatus connected to a print unit comprising:

image reading means on a carriage of the print unit for optically reading an original image and for producing image data representing the original image, said image reading means sequentially reading each of a plurality of areas of said original image, each of said plurality of areas being separated from each other;

designating means for designating each memory position of the plurality of desired parts of the original image;

carriage control means for moving said carriage to each of the plurality of areas of the original image designated by said designating means;

image memory means for storing image data produced by said image reading means; and storage control means, in response to the operation of said designating means, for sequentially storing a plurality of desired parts of the original image of said image memory means, said storage control means controlling said plurality of desired parts of the original image as one block of information, said storage control means comprising a central processing unit.

8. An apparatus according to claim 7, further comprising means for displaying image data of said image memory means.

9. An apparatus according to claim 7, further comprising designating means for designating an area to be read by said image reading means.

10. An image processing apparatus including a print unit comprising:

an optical image reading unit on a carriage of the print unit for reading an original image;

an image memory having an image storing area corresponding to the original image;

a display unit having a display screen for displaying an image stored in said image memory;

a designating unit for designating a desired area position on said display screen of said display unit;

a carriage control unit for moving said carriage to a corresponding area of the original image corresponding to said desired area designated by said designating unit; and a memory control unit for storing the read image in said image storing area of said image memory, said memory control unit storing the image so as to display the image in the desired area position on said display screen designated by said designating unit, said memory control unit comprising a central processing unit.

11. An apparatus according to claim 10, further comprising designating means for designating an area to be read by said image reading means.

12. An apparatus according to claim 10, wherein said designating means includes means for indicating movement of a cursor.

13. An image processing apparatus comprising:

optical reading means for reading an original image;

a unit for placing the original image thereon;

a carriage for causing said optical reading means to scan and move with respect to the original image placed on said unit;

an image memory having an image storing area corresponding to the original image;

display means for displaying an image stored in said image memory comprising a display screen;

designating means for designating a position on said display screen of said display means;

means for causing said carriage to move to a corresponding position of the original image corresponding to the position designated by said designating means; and memory control means for storing the read image in said image storing area of said image memory, said memory control means storing the read original image from said optical reading means on the basis of the designation of said designating means after said designating means designates the position on said display screen, said memory control means comprising a central processing unit.

14. An apparatus according to claim 13, further comprising designating means for designating an area to be read by said image reading means.

15. An apparatus according to claim 13, wherein said designating means includes means for indicating movement of a cursor.

* * * * *

UNITED STATES PATENT AND TRADEMARK OFFICE
CERTIFICATE OF CORRECTION

| | | |
|---|---|---|
| PATENT NO. | : | 5,631,980 |
| DATED | : | May 20, 1997 |
| INVENTOR(S) | : | Hiroshi MARUOKA |

It is certified that error appears in the above-identified patent and that said Letters Patent is hereby corrected as shown below:

<u>COVER PAGE</u>, [56], line 3, after "Sukonick", insert --et al.--; and
    Line 9, after "Tsuhara", insert --et al.--.

<u>Column 7</u>, line 65, delete "imaged" and insert therefor --image--.

Signed and Sealed this

Sixteenth Day of December, 1997

Attest:

BRUCE LEHMAN

Attesting Officer      Commissioner of Patents and Trademarks